United States Patent [19]

Fulger et al.

[11] 4,103,035
[45] Jul. 25, 1978

[54] METHOD FOR RETAINING SOFTNESS IN RAISINS

[75] Inventors: Charles V. Fulger, Battle Creek, Mich.; Thomas D. Morfee, Gig Harbor, Wash.

[73] Assignee: Kellogg Company, Battle Creek, Mich.

[21] Appl. No.: 378,124

[22] Filed: Jul. 11, 1973

Related U.S. Application Data

[63] Continuation-in-part of Ser. No. 171,011, Aug. 11, 1971, abandoned.

[30] Foreign Application Priority Data

Aug. 10, 1972 [GB] United Kingdom ............... 37270/72

[51] Int. Cl.$^2$ ............................ A23B 7/08; A23B 7/14
[52] U.S. Cl. .................................... 426/321; 426/615; 426/640
[58] Field of Search ............... 426/302, 102, 465, 321, 426/103, 310, 286, 431, 289, 281, 455, 486, 615, 640, 379, 207, 205

[56] References Cited

U.S. PATENT DOCUMENTS

| | | | |
|---|---|---|---|
| 119,442 | 9/1871 | Ackart | 426/270 |
| 1,434,837 | 11/1922 | Newby | 426/379 |
| 1,853,151 | 4/1932 | Segen | 426/302 |
| 1,886,233 | 11/1932 | Sanders | 426/364 |
| 2,005,184 | 6/1935 | Forrest | 426/363 |
| 2,278,469 | 4/1942 | Musher | 426/96 |
| 2,909,435 | 10/1959 | Walters | 426/102 |
| 3,006,773 | 10/1961 | Fitzgerald | 426/340 |
| 3,453,118 | 7/1969 | Jobin | 426/321 |
| 3,595,681 | 7/1971 | Kaplow | 426/324 |

OTHER PUBLICATIONS

Handbook of Food Additives, 1968, Furia; T. E., Editor, pp. 448–453.

*Primary Examiner*—Charles N. Hart
*Assistant Examiner*—Ernest G. Therkorn
*Attorney, Agent, or Firm*—Gary, Juettner & Pyle

[57] ABSTRACT

A method is disclosed for treating raisins and other whole dried fruit to provide a significant humectant content therein and to improve softness retention under storage conditions. The raisins are first treated with a hot, weak acid and are then washed and treated with glycerol, sorbitol, or other humectants, followed by washing and controlled drying to a moisture content of about from 12% to 20%.

17 Claims, No Drawings

METHOD FOR RETAINING SOFTNESS IN RAISINS

CROSS REFERENCE

This is a continuation-in-part of our co-pending application, Ser. No. 171,011, filed Aug. 11, 1971, now abandoned.

BACKGROUND OF THE INVENTION

This invention relates to a novel method for preserving or maintaining the softness of dried fruit under storage conditions, wherein the fruit is either stored in isolation or in combination with a relatively dry food product such as ready-to-eat cereal breakfast foods. More specifically, the present invention relates to an improvement over the method described in the Jobin U.S. Pat. No. 3,453,118, said patent being incorporated herein by reference.

Fresh raisins, even when sealed in waxed paper and foil within paperboard containers, progressively lose their softness and become hard, presumably because of moisture losses and chemical changes. The loss of softness or tenderness becomes more pronounced when the raisins are similarly packaged with dry cereal products, such as bran or corn flakes that have a low moisture content relative to the raisins. In order to prevent loss of moisture from the raisins to the cereal, it has been previously necessary to increase the moisture content of the cereal prior to packaging with the raisins. The addition of moisture to the cereal, however, causes a substantial loss of crispness, which is undesirable in many products.

The method of the aforesaid Jobin patent sought to improve softness retention in raisins by subjecting them to the treatment of dipping in a weak acid bath maintained at about 110° F., followed by washing and drying. Although this method produces beneficial results, it would be desirable to provide a means for extending the shelf life of raisins for even greater periods of time.

BRIEF DESCRIPTION OF THE INVENTION

In order to further improve the storage life of the raisins, we have discovered that the softness retention characteristics of raisins may be greatly increased if the preliminary acid treatment is followed by treatment with glycerol, a solution of sorbitol, or other edible polyalcohols having humectant properties. By sequentially treating the raisins in this particular manner, an improvement is realized that would not be possible by the utilization of either of the process steps alone. The acid treatment causes the raisins to become more receptive to the subsequent humectant treatment, with the result that greater amounts of humectant are absorbed within a given time. After treatment by the present method, the moisture in the raisins may decrease under storage conditions to about 6% before the raisins become unduly hard, whereas untreated raisins become unduly hard when their moisture content is down to a level of about 10%.

DESCRIPTION OF THE PREFERRED EMBODIMENT

It shall be understood that although the preferred embodiment is described in connection with whole raisins, the inventive process may be beneficially employed in connection with other dried fruits, such as sultanas, prune bits, date bits, currants and muscats, particularly those fruits which have an external skin which is essentially intact.

In the preferred embodiment, the process of the present invention comprises first treating cleaned raisins having a moisture content of about from 12% to 15% with an aqueous acidulating agent containing from about 0.5 to about 20% acid and heated to about 100° to about 120° F. for a period of from about 10 seconds to about 2 minutes. The acid employed may comprise mineral acids such as phosphoric, hydrochloric and sulfuric, or organic acids such as citric, malic, adipic and fumaric. A 3.0% aqueous phosphoric acid solution heated to a temperature of about 110° F., with a soaking period of about 15 seconds, has been found to give optimum results. After acid treatment, the raisins are washed in warm or hot water, preferably by spraying with water for about 15 seconds. After washing, the moisture content of the raisins is usually about 22%.

The acid treated and washed raisins are drained and then immersed and soaked in a polyalcohol humectant, preferably glycerol or a solution of glycerol and water for a period of about 24 hours. Alternatively, the raisins may be dipped into a bath of, or sprayed with pure or diluted glycerol and then drained and allowed to temper or stand for a period of about from 15 to 24 hours. If desired, a solution of sorbitol in glycerol may be used to good advantage. As a non-fully equivalent alternative, the treating agent may comprise a concentrated or diluted aqueous solution of sorbitol. Preferably, the glycerol and/or sorbitol application is part of a continuous treatment process, such that there will not be a great lapse of time between acid dipping, washing and application of humectant.

It will be understood that other edible polyalcohols having humectant properties may be employed, either alone or in mixture with glycerol and sorbitol, including propylene glycol and maltitol. Other suitable humectants include glucose, inverted sugar syrups, and mixtures thereof.

After the treatment with humectant has been completed, the raisins are washed again with water and are gently dried in a warm air stream to a final moisture content of about from 12% to 20%, preferably in the neighborhood of 16%. Optionally, after drying, the raisins may then be treated with a release agent, such as an oil or a lipid at an application level of about from 0.25% to 1.5%. Preferred materials are hydrogenated coconut oil heated to a temperature of about 150° F. or acetylated monoglycerides and applied by spraying at a level of about 0.25% by weight. The oil or lipid improves the free-flowing characteristics of the raisins and provides a minor improvement in softness retention. If desired, the oil-treated raisins may then be coated with sugar by applying 0.5% to 0.75% of an invert sugar solution, followed by dusting with granulated or powdered sugar.

The raisins are then ready to be packaged alone or with another food product, especially with a much drier ready-to-eat cereal breakfast food such as, for example, toasted bran or corn flakes having about 2% by weight moisture content.

As mentioned previously, it has been found that the prior acid treatment causes the raisins to become more receptive to the absorption of glycerol or other humectant. For example, raisins to which glycerine is topically applied will absorb about 3% glycerol, whereas the acid treated raisins will easily absorb much in excess of 3%. The glycerol or other humectant content may normally be controlled within a range between in excess of 3% and up to about 20% or higher. Moreover, it has been found that the rate of moisture loss in raisins treated by the present method is less than with raisins treated either with acid or with glycerol alone. The term "glycerol content" or "humectant content" as used herein means the amount of glycerol or other humectant found to be present in the interior of the raisins or other fruit after the surface thereof has been washed with water to remove extraneous humectant which has not been absorbed or which is merely present on the surface as a coating.

In the preferred embodiment of the invention, the treated raisins or other fruit will have a final glycerol or humectant content of about 4% to 6% where the raisins are to be packaged alone, and at least about 9% or higher where the raisins are to be packaged with a dry cereal. The moisture content of the raisins after completion of treatment is between about 12% and 18% and preferably about 13% to 16%.

It is also within the scope of the present invention to reprocess raisins and other dried fruits, which, after having been treated in accordance with the method of the present invention, do not contain a sufficiently high level of absorbed humectant. In such cases, it is possible to incorporate the fruit back into any of the processing stages prior to humectant treatment, in order to achieve additional infusion of humectant and attain better keeping qualities.

It has also been found that the freshness of the raisins and the initial moisture content thereof are factors which are related to the degree and extent of acid treatment required, but generally the acid treatment specified above is productive of the most consistent and reproducible results in achieving a rapid and high level of infusion of humectant into the raisins. If the raisins are fresh and plump, less acid treatment will be required to achieve beneficial results. In some cases, even soaking of the raisins in a hot water bath at a temperature of from about 90° F to about 140° F. for a period of about one to five minutes, or until the internal moisture content exceeds 16% moisture by weight, may often be sufficient to significantly enhance the subsequent absorption rate of humectant into the raisins.

The following are specific examples of the practice of the present invention, for the purpose of illustration.

EXAMPLE 1

Cleaned and sorted raisins of approximately 12% moisture were immersed in 3.0% agueous phosphoric acid at 110° F. for 20 seconds, and then rinsed with a water spray for 15 seconds. The raisins were then immersed in glycerol (95%ACS) for 24 hours at ambient temperature, after which they were drained and spray rinsed again. The raisins were then dried to a moisture content of about 16% in a 200° F. air stream. The raisins were then coated with hydrogenated coconut oil having a melting point of 110° F., at 1.5% by weight. The hot oil was applied in a heated (130° F.) coating drum through a spray nozzle. The resulting raisins were soft, tender and flavorful with excellent softness retention during storage. The raisins were incorporated at 28% by weight into sugar-frosted corn flakes of about 3.5% moisture. The combination was packed in cardboard cartons lined with a single layer of waxed paper. One group of samples were stored at ambient temperature and humidity, while a second group of samples were stored at a temperature of about 96° to 104° F. and 17% to 18% relative humidity. The samples were evaluated weekly by a panel of judges and compared to control samples containing untreated raisins packaged and stored in the same manner. The treated raisins stored at elevated temperature retained a soft, tender texture for 10 weeks, while the untreated raisins become dehydrated and unacceptably hard after three weeks. Treated raisins stored at ambient temperature were essentially unchanged in texture after 20 weeks while the untreated raisins became tough and chewy after 5 weeks. Analysis by gas-liquid chromatography showed that the treated raisins initially contained 11.2% glycerol by weight.

EXAMPLE 2

Example 1 was repeated with the omission of application of the oil. Evaluation of the contained product under storage conditions showed only minor decreases in softness retention of the treated raisins.

EXAMPLE 3

The conditions of Example 1 were repeated, except that the glycerol soaking step was replaced by soaking in a 70% aqueous sorbitol solution for 24 hours, and one group received oil treatment whereas the other did not. Both sorbitol treated groups retained good softness for about five weeks when stored at elevated temperatures and in excess of twenty weeks when stored at ambient temperatures.

EXAMPLE 4

The conditions stated in Example 1 were repeated, except that the raisins were briefly dipped in glycerol and tempered for 24 hours, rather than soaked. The softness retention characteristics of the raisins were generally similar to those described in Example 1.

EXAMPLE 5

The conditions stated in Example 1 were repeated, except that the raisins were treated with a solution containing 70% glycerol and 30% sorbitol by weight. The softness retention characteristics of the raisins were similar to or better than those described in Example 1.

EXAMPLE 6

Comparative tests were conducted to compare the method of the present invention to other treatment methods. Sixteen test specimens of Midget Thompson Seedless Raisins, both field raisins (having approximately 11% moisture) and commercial raisins (having approximately 15% moisture) were prepared as follows:
Group 1, Control
  Subgroup A, Field Raisins
    Test Specimen #1
      Field raisins were cleaned and quickly rinsed, and coated with 0.25% by weight of acetylated monoglyceride.
    Test Specimen #2
      Field raisins as received were coated with 0.25% by weight of acetylated monoglyceride.
  Subgroup B, Commercial Raisins
    Test Specimen #3
    Test Specimen #4
      Commercial raisins were coated with 0.25% by weight of acetylated monoglyceride.
Group 2, Raisins Dipped in Acid, i.e., Treated Pursuant to the Disclosure of U.S. Pat. No. 3,453,118
  Test Specimen #5

Test Specimen #6

Field raisins were disposed for a period of 20 to 30 seconds in a 110° F. aqueous bath of 3% phosphoric acid to raise the moisture content thereof to about 22%. The raisins were then washed with water, dried to a moisture content of 16% and coated with 0.25% by weight of acetylated monoglyceride.

Group 3, Raisins Soaked in Hot Water

Test Specimen #7: Treated the same as Test Specimens #5 and 6, but without acid in the water and for a retention time in the order of 4 to 5 minutes sufficient to raise the moisture content to 23%, followed by coating with acetylated monoglyceride.

Group 4, Raisins Soaked in Hot Water and Dipped in Glycerine

Test Specimen #8: Field raisins were soaked in 120° F water to raise the moisture content to 23%, dipped in 100° F glycerine for 30 seconds, drained, tempered 24 hours at 100° F rinsed in cool water, dried to 15–16% moisture content, and coated with 0.25% by weight of acetylated monoglyceride. Upon analysis, the raisins contained 4.7% glycerine.

Group 5, Raisins Dipped in Glycerine

Subgroup A - Field Raisins

Test Specimen #9

Field raisins were first rinsed with cool water to remove the dirt and fines, and then treated as described for Test Specimen #10.

Test Specimen #10

Field raisins were immersed for 30 seconds in glycerine at 100° F., after which the raisins were tempered at 100° F. for 24 hours. The raisins were then rinsed in cool water for 30 seconds. Test Specimen #9 was dried to a final moisture content of 16%. Test Specimen #10 remained at 11% moisture. When analyzed, Test Specimen #9 contained 1% by weight of glycerine and Test Specimen #10 contained 1.9%.

Subgroup B - Commercial Raisins

Test Specimen #11

Test Specimen #12

Commercial raisins were treated the same as the field raisins of Specimens #9 and #10 except that the preliminary rinsing step was not necessary. When analyzed, Test Specimen #11 contained 2% by weight of glycerine and Test Specimen #12 contained 4% by weight of glycerine.

Group 6, Topical Application of Glycerine to Raisin

Subgroup A - Field Raisins

Test Specimen #13

Field raisins were first rinsed in cool water to remove dirt and fines. Glycerol was then sprayed on the raisins in the amount of 10% by weight and then coated with 0.25% by weight of acetylated monoglyceride.

Subgroup B - Commercial Raisins

Test Specimen #14

Glycerol was sprayed onto commercial raisins in the amount of 10% by weight, followed by the same coating of acetylated monoglyceride. The raisins of Test Specimen #13 and #14 when subsequently analyzed both carried 8% glycerine. It is believed that the entirety of this was topical and not contained within the raisins and that it would have been removed if the raisins were rinsed.

Group 7, Raisins Dipped in Acid, Rinsed, Tempered, Dipped in Glycerine, Tempered, Rinsed, Dried and Coated.

Test Specimen #15

Field raisins were mechanically cleaned in the conventional commercial manner and (1) dipped for 30 seconds in a 110° F. aqueous bath of 3% phosphoric acid, (2) rinsed with 100° F. water, (3) tempered for 10 minutes, (4) sprayed with 100° F. glycerine, (5) tempered for 24 hours at 100° F., (6) rinsed with cool water, (7) dried to 16% moisture content, and (8) coated with 0.25% by weight of acetylated monoglyceride. When analyzed, the raisins contained 10% by weight of glycerine.

Test Specimen #16

Field raisins were rinsed with water to remove dirt and fines and were brought up to a temperature of about 110° F. The raisins were then (1) dipped for a full 30 seconds in a 120° F. aqueous bath of 3% phosphoric acid, (2) rinsed with 110° F. water, (3) tempered for 15 to 20 minutes, (4) dipped in 120° F. glycerine for a full 30 seconds, (5) tempered for 24 hours at 100° F., (6) rinsed with cool water, (7) dried to exactly 16% moisture content, and (8) coated with 0.25% by weight of acetylated monoglyceride. When analyzed, the raisins contained 23% by weight of glycerine.

Each of the sixteen test specimens above described was combined with dry bran flakes having a moisture content of 2–3% in the proportion of 28% by weight of raisins. Several samples of each specimen were packaged in standard breakfast cereal cartons; a number of such samples of each specimen were stored in a hot room maintained at a temperature of 100° F. and a relative humidity of 12–15%, and a second set of such samples of each specimen were stored under normal ambient conditions. Samples of each specimen stored in the hot room were tested at two-week intervals, and samples of each specimen stored under normal ambient conditions were tested at four-week intervals.

The samples were each tested by a panel of experts skilled in the analysis of cereal breakfast foods. Each member of the panel evaluated each sample (a) as a whole, (b) as to the bran flakes and (c) as to the raisins, on the following basis:

| | |
|---|---|
| Satisfactory: | No defects recognizable by an expert. |
| Acceptable: | Defects recognizable by an expert but not recognizable as such by comsumers. |
| B.S.L.: | Below standard limitations. Defects noticeable by comsumers, e.g., raisins noticeably hard. |
| Unsatisfactory: | Essentially inedible, e.g., raisins that are so hard they cannot safely be offered for consumption. |

The samples were all served to the members of the panel as raisin bran breakfast cereals, in bowls with cold milk, and with sample identifications not known to or recognizable or decipherable by the members of the panel.

The test results relative to the raisins in the bran are summarized in the following table:

| Group | Subgroup | Test Specimen | Stored at 100° F. | Ambient Storage |
|---|---|---|---|---|
| 1 | A | #1 | 2 wks. - Unsatisfactory | 4 wks. - Unsatisfactory |
|   |   | #2 | 2 wks. - Unsatisfactory |   |
|   | B | #3 | 2 wks. - BSL | 4 wks. - Unsatisfactory |
|   |   |   | 4 wks. - Unsatisfactory |   |
|   |   | #4 | 2 wks. - Unsatisfactory |   |
| 2 |   | #5 | 2 wks. - Unsatisfactory | 4 wks. - Unsatisfactory |
|   |   | #6 | 2 wks. - Unsatisfactory | 4 wks. - Unsatisfactory |
| 3 |   | #7 | 2 wks. - Unsatisfactory | 4 wks. - Unsatisfactory |
| 4 |   | #8 | 2 wks. - BSL | 4 wks. -BSL |
|   |   |   | 4 wks. - Unsatisfactory | 8 wks. - BSL |
|   |   |   |   | 12 wks. - Unsatisfactory |
| 5 | A | #9 | 2 wks. - Unsatisfactory | 4 wks. - Unsatisfactory |
|   |   | #10 | 2 wks. - Unsatisfactory | 4 wks. - Unsatisfactory |
| 5 | B | #11 | 2 wks. - Unsatisfactory | 4 wks. - BSL |
|   |   |   |   | 8 wks. - BSL |
|   |   |   |   | 12 wks. - Unsatisfactory |
|   |   | #12 | 2 wks. - Unsatisfactory | 4 wks. - BSL |
| 6 | A | #13 | 2 wks. - Unsatisfactory | 4 wks. - Unsatisfactory |
|   | B | #14 | 2 wks. - Unsatisfactory | 4 wks. - BSL |
|   |   |   |   | 8 wks. - BSL |
|   |   |   |   | 12 wks. - Unsatisfactory |
| 7 |   | #15 | 2 wks. - Acceptable |   |
|   |   |   | 4 wks. - Unsatisfactory | 4 wks. - Acceptable |
|   |   |   |   | 8 wks. - Acceptable |
|   |   |   |   | 16 wks. - Acceptable |
|   |   |   |   | 26 wks. - BSL |
|   |   | #16 | 2 wks. - Acceptable |   |
|   |   |   | 4 wks. - Acceptable | 4 wks. - Satisfactory |
|   |   |   | 16 wks. - BSL | 20 wks. - Acceptable |

When the product was judged unsatisfactory, testing was concluded. The tests being conducted were purposely accelerated over conventional commercial practices principally in two respects: (1) adding the raisins to bran flakes having only a 2 to 3% moisture content as compared to the conventional 7 to 8% moisture content, and (2) storing one set of samples at 100° F. and 12 to 15% relative humidity rather than under ambient conditions.

From the foregoing, it may be seen that raisins treated in accordance with the present invention are superior to raisins treated by other methods, both in terms of softness retention and uptake of humectant. The raisins may be either used alone or may be incorporated into other foods, including relatively dry cereal.

We claim:

1. The method for improving softness retention characteristics of whole dried fruits having an essentially intact surface skin which comprises first contacting the surface skin of said dried fruits with a hot, weak acid solution for a period of time to cause said fruits to become more acceptable to subsequent humectant absorption, and then, as a separate step, contacting the skin of said dried fruits with an edible polyalcohol humectant until in excess of 3% humectant has been absorbed by said fruit, and thereafter drying the treated fruit to a moisture content of from about 12% to about 20%.

2. The method of claim 1 wherein the dried fruits are selected from the group consisting of sultanas, currants and raisins.

3. The method of claim 1 wherein the dried treated fruits are subsequently treated with a material selected from the group consisting of oils and lipids.

4. The method of claim 1 wherein the humectant is glycerol and the fruits are soaked therein for a period of about 24 hours.

5. The method of claim 1 wherein the humectant is glycerol and the fruits are soaked therein until the level of glycerol contained in said fruits is from about 3% to about 20% by weight.

6. The method of claim 1 wherein the humectant is glycerol and the fruits are briefly dipped therein and allowed to temper for a period of up to about 24 hours.

7. The method of claim 1 wherein the humectant is a concentrated aqueous solution of sorbitol.

8. The method of claim 1 wherein the poly alcohol humectant is selected from the group consisting of glycerol, sorbitol, propylene glycol, maltitol, and mixtures thereof.

9. The method of claim 1 wherein the humectant is a mixture of glycerol and sorbitol.

10. Method for improving softness retention characteristics of raisins under storage conditions which comprises disposing soft fresh raisins in an aqueous weak acid bath for a period of from about 10 seconds to 2 minutes in order to cause said raisins to become more acceptable to subsequent humectant absorption, removing the raisins from said bath and washing, and then contacting the skin of the raisins with a humectant selected from the group consisting of glycerol, sorbitol and mixtures thereof for a period of time sufficient for said raisins to absorb in excess of 3% of said humectant, and then drying the raisins to a moisture content of from about 12% to about 20%.

11. The method of claim 10 wherein the acid in said bath is phosphoric acid.

12. The method of claim 10 wherein treating the raisins with humectant comprises soaking the raisins in said humectant.

13. The method of claim 10 wherein treatment with said humectant comprises dipping the raisins therein and then allowing the raisins to temper.

14. The method of claim 10 wherein treatment with said humectant comprises spraying said humectant onto said raisins.

15. The method of claim 10 wherein the resulting raisins are coated with an oil or lipid.

16. The method of claim 10 wherein the treated and coated raisins are packaged with a dry ready-to-eat cereal.

17. The method for improving softness retention characteristics of whole dried fruits under storage conditions which comprises first treating the dried fruits selected from the group consisting of sultanas, currants and raisins having essentially intact surface skins with a weak acidulating agent for a time sufficient to cause said dried fruits to become more receptive to subsequent humectant absorption, washing the dried fruits, and then, as a separate step, treating the dried fruits with an edible humectant selected from the group consisting of glycerol, sorbitol, propylene, glycol, malitol, glucose, inverted sugar syrups and mixtures thereof until the fruits absorb in excess of 3% humectant.

* * * * *